United States Patent [19]

Maynard

[11] Patent Number: 5,647,573
[45] Date of Patent: Jul. 15, 1997

[54] HIGH PRESSURE FLUID VALVE ASSEMBLY

[75] Inventor: Alfred Charles Maynard, Pittsfield, Mass.

[73] Assignee: Martin Marietta Corporation, Bethesda, Md.

[21] Appl. No.: 556,674

[22] Filed: Nov. 13, 1995

[51] Int. Cl.⁶ .......................... F16K 35/00; F16K 51/00
[52] U.S. Cl. .................... 251/94; 251/89; 251/144
[58] Field of Search .................. 251/144, 89, 94

[56] References Cited

U.S. PATENT DOCUMENTS

| | | | |
|---|---|---|---|
| 2,737,971 | 3/1956 | Shields | 251/294 |
| 3,590,886 | 7/1971 | Judd | 251/294 |
| 3,605,708 | 9/1971 | Jordan | 251/294 |
| 3,941,141 | 3/1976 | Robert | 251/294 |

FOREIGN PATENT DOCUMENTS 648445  11/1962  Italy ............................. 251/89

*Primary Examiner*—A. Michael Chambers
*Attorney, Agent, or Firm*—Robert A. Cahill; Geoffrey H. Krauss

[57] ABSTRACT

To resist mechanical forces tending to unseat a fluid valve applied to seal against a high fluid pressure, a fluid valve assembly is equipped with a valve block that, in response to the high fluid pressure, causes a locking member to be forcibly wedged into clamping engagement with the stem of a valve, thereby securing the valve in its closed, seated position. When the high fluid pressure is relieved, the valve stem is unclamped, and the valve can then be readily lifted to an open position.

7 Claims, 1 Drawing Sheet

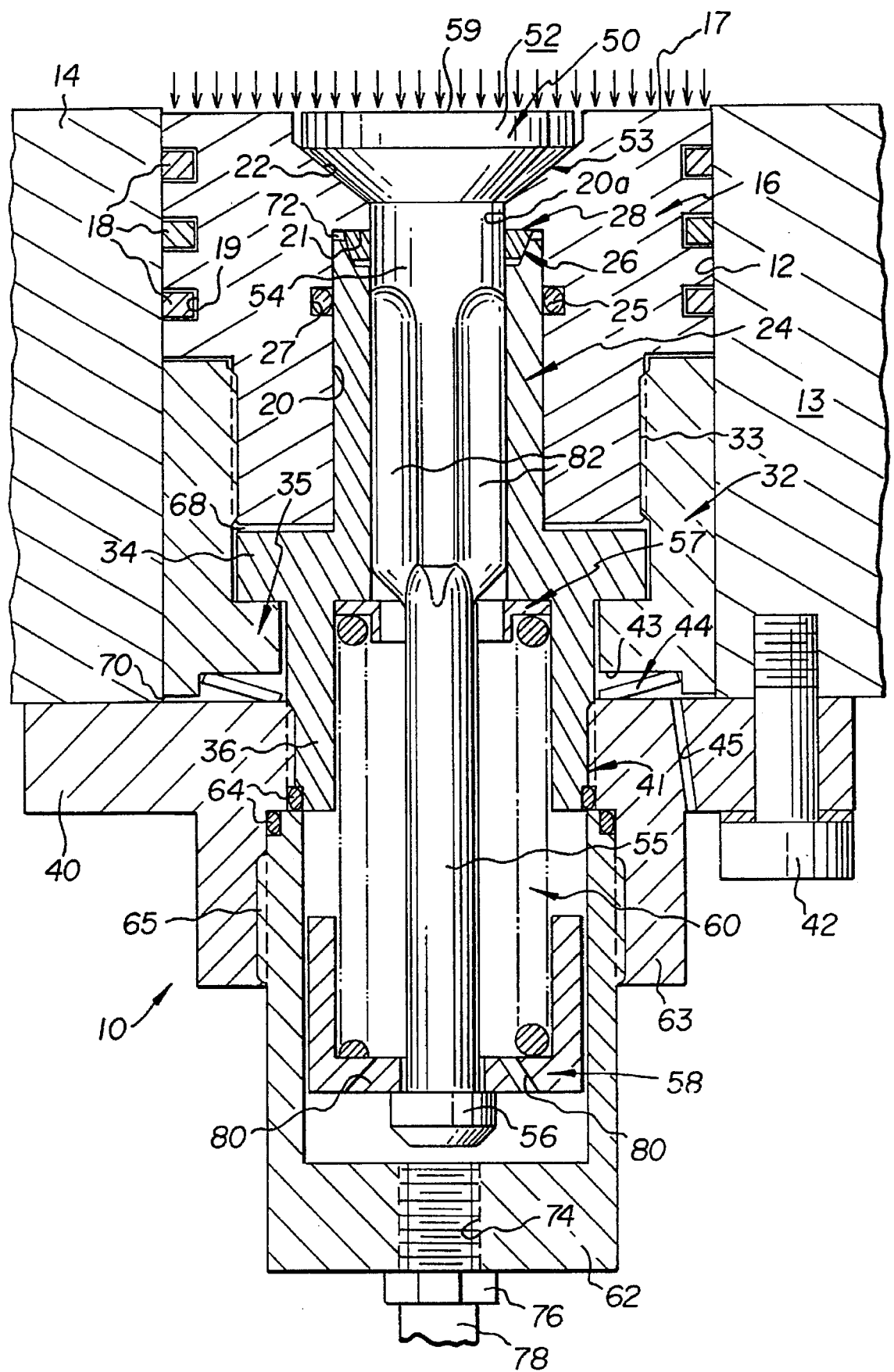

HIGH PRESSURE FLUID VALVE ASSEMBLY

BACKGROUND OF THE INVENTION

1. Field of the Invention

The present invention relates to fluid valves. More particularly, the invention relates to a valve assembly capable of maintaining a seated (closed) position in the face of shock loads tending to unseat the valve.

2. Description of the Related Art

In high fluid pressure environments, it is often difficult to maintain a high integrity fluid valve seal. This difficulty is exacerbated in applications where fluidic components, such as valves, are subjected to vibrational and shock loadings of sufficient magnitude to unseat (open) fluid valves, resulting in spurious fluid flow. When high fluid pressures occur, often accompanied by high fluid temperatures, spurious valve openings can have damaging consequences.

SUMMARY OF THE INVENTION

Therefore, it is an objective of the invention to provide a valve assembly capable of providing a high integrity fluid seal against high fluid pressures.

Another objective of the present invention is to provide a valve assembly capable of maintaining a closed position in the presence of extreme vibrational and shock loadings.

A further objective of the present invention is to provide a valve assembly that is effectively locked in a closed position by the high fluid pressures it is intended to seal against, thereby reliably preventing unintentional opening of the valves.

Additional features and advantages of the invention will be set forth in the description which follows, and in part will be apparent from the description, or may be learned by practice of the invention. The objectives and other advantages of the invention will be realized and attained by the apparatus particularly pointed out in the written description and claims hereof, as well as the appended drawings.

To achieve these and other objectives, and in accordance with the purpose of the invention as embodied and broadly described, a valve assembly, according to the invention, comprises a valve block for sliding receipt in a through-hole in a wall of a vessel, the valve block including a through-bore terminating in a valve seat facing an interior of the vessel and a face surface surrounding the valve seat; a valve including a head and a stem extending through the through-bore in the valve block; a closing spring acting on the valve to bias the valve head to a closed position in seating engagement with the valve seat; a locking sleeve attached to the vessel wall and slidingly received in the through-bore of the valve block in surrounding relation with the valve stem; a bracket fixedly mounting the locking sleeve to the vessel wall; and a locking element positioned between the valve block and the locking sleeve, the locking element being compressed into clamping engagement with the valve stem by movement of the valve block in response to a force acting on the valve block face surface that is produced by high fluid pressure in the vessel.

It is to be understood that both the foregoing general description and the following detailed description are exemplary and explanatory and are intended to provide further explanation of the invention as claimed.

BRIEF DESCRIPTION OF THE DRAWINGS

The accompanying drawing, which is incorporated in and constitutes a part of this specification, illustrates an embodiment of the invention and, together with the description, serves to explain the objects, advantages, and principles of the invention.

The sole FIGURE of the drawing is a sectional view of a valve assembly structured in accordance with a preferred embodiment of the invention.

DETAILED DESCRIPTION OF THE PREFERRED EMBODIMENT

The valve assembly of the present invention, generally indicated at 10, is illustrated as being installed in an opening 12 drilled through the wall 13 of a vessel 14 containing a fluid (gas, liquid or combination of both) at high pressures, typically accompanied by high temperatures. The valve assembly includes a cylindrical valve block 16 that is slidingly received in wall opening 12 in close-fitted fashion. Seal rings 18, accommodated in annular grooves 19 in the valve block periphery, preclude fluid leakage at the valve block-wall opening interface. The valve block is provided with a through-bore 20 that is countersunk to create an annular shoulder 21. The resulting reduced-diameter section, indicated at 20a, of through-bore 20 terminates in a flared section to provide a conical valve seat 22 facing the interior of vessel 14.

A locking sleeve 24, sized to be slidingly received in the bore 20 of valve block 16, has a free end terminating in gapped relation with bore shoulder 21 and machined to provide an annular cavity 26 facing the bore shoulder. The interface between the locking sleeve and the valve block is sealed against fluid leakage by an O-ring 25 lodged in an annular groove 27 machined into the valve block bore 20. A locking member 28, disposed in this cavity, is preferably in the form of a metallic split ring having a cylindrical inner surface of a diameter closely approximating the inner diameter of the locking sleeve and a tapered outer surface conforming to a bevelled sidewall of cavity 26. The significance of these structural features of the present invention will become apparent from the valve operating description to follow.

A cylindrical extension 32 of valve block 16, also slidingly received in the vessel wall opening 12, is joined with the valve block by a threaded joint, indicated at 33. Lapping radial flanges 34 and 35 of locking sleeve 24 and valve block extension 32, respectively, hold these members in assembly. An outer cylindrical section 36 of locking sleeve 24 is affixed to a mounting bracket 40 by a threaded joint, indicated at 41, and the bracket is attached to the vessel wall 13 by a plurality of bolts, one seen at 42. Radial flange 35 of valve block extension 32 is undercut to provide an annular recess 43 that accommodates a spring 44 backed by bracket 40 and acting to bias the valve block 16 and its extension to an inward limit position defined by the engagement of flange 35 with flange 34 of the fixedly-mounted locking sleeve 24. Spring 44 is preferably in the form of a bevel spring washer to conserve space. The bevel spring recess 43 is vented through a passage 45 drilled through bracket 40 to ensure that valve block movement is not impeded by positive and negative fluid pressures that would otherwise develop in this recess space.

A valve, generally indicated at 50, includes a valve head 52 machined to provide a conical shoulder surface 53 conforming to conical valve seat 22. A valve stem 54, integral with the valve head, is slidingly received through the reduced diameter section 20a of the valve block bore 20 inwardly of shoulder 21, locking sleeve 24, and locking member 28, with a reduced diameter valve stem extension 55 terminated at its outer end by a knob 56. An annular spring seat 57, surrounding the valve stem extension, is received in the cup-shaped interior of locking sleeve section 36, and a spring retainer 58 is fitted on the valve stem extension in position against the terminating knob 56. A coiled compression spring 60 is captured between spring seat 57 and spring retainer 58 and acts between the fixed locking sleeve 24 and valve 50 to bias valve head 52 into fluid sealing, seated engagement with valve seat 22.

Finally, a cup-shaped closure member 62 is screwed into an internally threaded hub 63 of bracket 40. O-ring seals 64 prevent fluid leakage past the threaded joint 41 between bracket 40 and locking sleeve 24 and past the threaded joint 65 between closure member 62 and bracket hub 63.

When the valve assembly 10 is in its closed position illustrated in the drawing, spring 44 maintains valve block 16 in a released position against the force of valve closing spring 60, thus maintaining a gap 68 between the outer end surface of valve block 16 and locking sleeve flange 34, a gap 70 between the outer end of valve block extension and bracket 40, and a gap 72 between bore shoulder 21 and the inner end of locking sleeve 24. When the fluid in vessel 14 is pressurized to a high magnitude, the resulting forces exerted on the exposed surface 17 of valve block 16 and on the exposed surface 59 of valve head 52, drive valve 50 and the valve block and its extension 32 as a unit in the direction of the applied pressure to a locking position. Gaps 68, 70, and 72 are reduced as spring 44 compresses and, in the process, shoulder 21 forces locking member 28 into cavity 26. The wedging action produced as the tapered outer surface of the locking split ring 28 slides against the beveled sidewall of cavity 26 closes the locking split ring, as well as radially compresses the locking split ring in clamping engagement with the valve stem 54. This clamping engagement effectively locks the valve 50 in its closed position and thus cannot be unseated by externally inflicted shock and vibrational loadings, such as may be encountered in liquid propellant gun applications. It will be appreciated that the magnitude of the clamping engagement of the split ring 28 against valve stem 54 is directly related to the magnitude of fluid pressure in vessel 14, and thus locking effectiveness increases as the vessel fluid pressure increases. Also to be noted is that while the engagement of the conical surfaces of valve shoulder 53 and valve seat 22 serve as the primary fluid seal, the clamping engagement of locking split ring 28 with the valve stem 54 provides an effective secondary fluid seal.

When the fluid pressure in vessel is relieved, valve block 16 and piston 50 are restored to their release positions by spring 44, the widths of gaps 68, 70, and 72 increase, and the clamping engagement of split ring 28 with valve stem 54 is relaxed.

If valve assembly 10 is utilized in a poppet valve application, closure member 62 may be machined with a tapped bore 74 to receive a threaded fitting 76 terminating a fluid line 78 leading from a source of pressurized fluid (not shown). When pressurized fluid is introduced into the valve assembly 10, it flows through passages 80 in spring retainer 58 to fill a plurality of elongated grooves 82 provided in the section of valve stem 54 surrounded by locking sleeve 26. The forces exerted by this pressurized fluid on the closed inner ends of grooves 82 overpower the valve closing force of spring 60, and valve 50 is lifted (moved upwardly in the drawing figure) sufficiently to expose the closed ends of grooves 82 inwardly beyond the reduced diameter section 20a of valve block bore 20. The valve assembly is then opened to admit the pressurized fluid into vessel 14. When the pressure of this vessel-filling fluid is removed, spring 60 restores the valve assembly to its closed position illustrated in the drawing.

It will be appreciated that, rather than relying on the pressure of the vessel-filling fluid to drive the valve assembly to its open position, a mechanical force exerted by a member, such as a tappet, may be utilized for this purpose.

It will be apparent to those skilled in the art that various modifications and variations can be made in the disclosed valve assembly without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fluid valve assembly comprising:

a valve block for sliding receipt in a through-hole in a wall of a vessel, the valve block including a through-bore terminating in a valve seat facing an interior of the vessel and a face surface surrounding the valve seat;

a valve including a head and a stem extending through the through-bore in the valve block;

a closing spring acting on the valve to bias the valve head to a closed position in seating engagement with the valve seat;

a locking sleeve slidingly received in the through-bore of the valve block in surrounding relation with the valve stem;

a bracket fixedly mounting the locking sleeve to the vessel wall; and a locking member, positioned between the valve block and the locking sleeve, being compressed into clamping engagement with the valve stem by movement of the valve block in response to a force acting on the valve block face surface produced by high fluid pressure in the vessel.

2. The fluid valve assembly defined in claim 1, further including a release spring acting against the valve body to relax the clamping engagement of the locking member with the valve stem when the fluid pressure in the vessel is relieved.

3. The fluid valve assembly defined in claim 2, wherein the valve block face surface is exposed to the high fluid pressure in the vessel, and the valve and valve block move as a unit in response to the fluid pressure force, thereby maintaining the seating engagement of the valve head with the valve seat.

4. The fluid valve assembly defined in claim 3, wherein the locking member is ring-shaped and surrounds the valve stem.

5. The fluid valve assembly defined in claim 4, wherein the locking sleeve includes a free end with an annular cavity having a bevelled sidewall formed therein, the locking member being positioned in the cavity for radial compression into clamping engagement with the valve stem in response to the valve body movement.

6. The fluid valve assembly defined in claim 5, wherein the locking member is a metallic split ring having a tapered outer surface contacting the cavity bevelled sidewall.

7. The fluid valve assembly defined in claim 5, wherein the through-bore in the valve block includes a shoulder facing the cavity and engaging the locking member to produce the radial compression thereof.

* * * * *